(12) United States Patent
Mertens (10) Patent No.: US 11,131,396 B2
(45) Date of Patent: Sep. 28, 2021

(54) INLET VALVE FOR THE INLET OF A COMPRESSOR ELEMENT AND COMPRESSOR AND COMPRESSOR ELEMENT EQUIPPED WITH IT

(71) Applicant: ATLAS COPCO AIRPOWER, NAAMLOZE VENNOOTSCHAP, Wilrijk (BE)

(72) Inventor: Joris Mertens, Wilrijk (BE)

(73) Assignee: ATLAS COPCO AIRPOWER, NAAMLOZE VENNOOTSCHAP, Wilrijk (BE)

(*) Notice: Subject to any disclaimer, the term of this patent is extended or adjusted under 35 U.S.C. 154(b) by 110 days.

(21) Appl. No.: 16/620,347

(22) PCT Filed: Jun. 4, 2018

(86) PCT No.: PCT/IB2018/053975
§ 371 (c)(1),
(2) Date: Dec. 6, 2019

(87) PCT Pub. No.: WO2018/234910
PCT Pub. Date: Dec. 27, 2018

(65) Prior Publication Data
US 2020/0173563 A1 Jun. 4, 2020

Related U.S. Application Data

(60) Provisional application No. 62/522,871, filed on Jun. 21, 2017.

(30) Foreign Application Priority Data

Sep. 8, 2017 (BE) .................................. 2017/5641

(51) Int. Cl.
*F16K 3/26* (2006.01)
*F04C 29/12* (2006.01)

(52) U.S. Cl.
CPC ............ *F16K 3/267* (2013.01); *F04C 29/124* (2013.01)

(58) Field of Classification Search
CPC ........ F04C 15/064; F04C 28/06; F04C 28/12; F04C 28/16; F04C 28/24; F04C 29/124; F04B 49/225
See application file for complete search history.

(56) References Cited

U.S. PATENT DOCUMENTS 2,997,227 A 8/1961 Ternent
4,406,588 A * 9/1983 Hofmann ................ F04B 49/08
417/281

(Continued)

FOREIGN PATENT DOCUMENTS

EP 1 094 222 A1 4/2001
EP 1 251 280 A1 10/2002
WO 2007/140550 A1 12/2007

OTHER PUBLICATIONS

Written Opinion for PCT/IB2018/053975, dated Aug. 22, 2018.
International Search Report for PCT/IB2018/053975, dated Aug. 22, 2018.

*Primary Examiner* — Hailey K. Do
(74) *Attorney, Agent, or Firm* — Sughrue Mion, PLLC (57) ABSTRACT

An inlet valve containing a housing with an entry and an exit and an internal part which together with an external part delimits a flow channel between entry and exit, whereby this flow channel is closable by a valve. The valve includes a piston and a valve member. The piston slides in the housing and is connected with the exit and the valve member is formed by a valve shaft piston which slides in the piston such that in rest mode the valve member is pushed by the piston against valve seat. Between the valve shaft piston and the piston a chamber is enclosed which comes into fluid connection with the pressure vessel and has a blow-off exit (Continued)

forming a fluid connection between the chamber and the entry, whereby the valve shaft piston contains a bypass channel connected with the chamber and the sidewall of the valve shaft piston.

21 Claims, 7 Drawing Sheets

(56) References Cited

U.S. PATENT DOCUMENTS

| | | | |
|---|---|---|---|
| 5,388,967 A | | 2/1995 | Firnhaber et al. |
| 5,533,873 A | * | 7/1996 | Kindl ............... F04B 49/225 137/529 |
| 5,899,435 A | * | 5/1999 | Mitsch ............... F16K 25/00 251/62 |
| 6,431,210 B1 | | 8/2002 | Lowe et al. |

* cited by examiner

INLET VALVE FOR THE INLET OF A COMPRESSOR ELEMENT AND COMPRESSOR AND COMPRESSOR ELEMENT EQUIPPED WITH IT

CROSS REFERENCE TO RELATED APPLICATIONS

This application is a National Stage of International Application No. PCT/IB2018/053975 filed Jun. 4, 2018, claiming priority based on U.S. Provisional Application No. 62/522,871 filed Jun. 21, 2017 and Belgian Patent Application No. 2017/5641 filed Sep. 8, 2017.

BACKGROUND OF THE INVENTION

Field of the Invention

The present invention relates to an inlet valve for the inlet of a compressor element.

Background

In the world of compressors the application of an inlet valve on the inlet of a compressor element is adequately known for oil or liquid injected compressors whereby oil or another liquid is injected in the compressor element during the operation of the compressor for the purposes of lubrication, cooling and/or sealing between the rotating parts of the compressor element.

Such compressors contain a compressor element driven by a motor with an inlet for the suction of a gas to be compressed and a compressed gas outlet to which a pressure conduit is connected which leads the compressed gas to a pressure vessel in which the compressed gas is buffered under pressure to be supplied via an exit of the pressure vessel to a user network.

The oil or other liquid present in the compressed gas is separated in the pressure vessel and collected and injected from there into the compressor element by the pressure built up in the pressure vessel.

The application of an inlet valve or so-called "unloader" in such compressors is known to, when there is no consumption of compressed gas, let the compressor element operate unloaded by closing the inlet with the inlet valve to not suck in and compress extra air and at the same time blow off the pressure in the pressure vessel to the environment via the same inlet valve.

Consequently, the pressure in the pressure vessel is kept as low as possible such that the compressor element in this case experiences little pressure resistance, which is favourable for the power consumption during this phase of no-load operation.

This method of no-load operation of the compressor element is more energy efficient for fixed-speed compressors whereby the motor is stopped every time when there is no consumption and is started again when consumption resumes.

The blow-off of the pressure vessel is also applied at the start-up to limit the pressure in the pressure vessel during this phase so that the start-up requires less energy. This is also applied when shutting off and in the event of an emergency stop.

Another application is known whereby during the no-load operation the inlet valve is closed and a small amount of gas is returned from the pressure vessel to the inlet of the compressor element or bypassed to thus pump this gas around in closed circuit and maintain a minimum pressure in the pressure vessel which is necessary for an adequate oil or liquid injection.

Essentially two types of inlet valves are known, i.e. the spring-controlled inlet valves and the vacuum-controlled inlet valves.

In the spring-controlled inlet valves the inlet valve is pushed open by the pressure in the pressure vessel and closed again by means of a spring. Keeping the inlet valve closed requires considerable force. The drawback of such inlet valves is that they are relatively complex and contain many parts.

In the vacuum-controlled inlet valves the opening and closing of the valve is controlled by means of several control pressure valves.

A danger with such inlet valves is that in the event of an emergency stop whereby the drive suddenly stops, for example, the inlet valve remains open such that the gas flows back in a reverse direction via the compressor element from the pressure vessel to the inlet due to the pressure in the pressure vessel and takes with it an amount of oil from the pressure vessel and ejects it via the inlet. This implies that the inlet filter at the inlet of the compressor element will be covered in oil, which is not desirable of course.

To prevent this, such vacuum-controlled inlet valves are provided with an extra non-return valve which represents an extra cost. Furthermore, such inlet valves are also relatively complex and require a reasonably complex control of the control valves.

An example of such a vacuum-controlled inlet valve is described in BE 1.015.079 in the name of the same applicant.

Yet another application whereby an inlet valve is applied is described in BE 1.021.804 of the same applicant, to prevent in an oil-injected compressor with a variable rotational speed condensation in the oil as a result of a too low oil temperature when switching off the motor, whereby in that case the motor is not immediately stopped but continues to be driven with an open inlet valve to be able to use the compression heat of the compressed gas to heat the oil.

In this case a relatively complex control is needed which uses at least two control valves, i.e. one to close the inlet valve, one for condensate prevention and possibly an extra control valve to blow off the pressure vessel when necessary.

The purpose of the present invention is to provide a solution for one or more of the aforementioned and other disadvantages.

SUMMARY OF THE INVENTION

To this end, the invention relates to an inlet valve for the inlet of a compressor element of a compressor provided with a pressure vessel connected to the outlet of the compressor element, the inlet valve containing a housing with an external part with an entry for the inlet valve and an exit for the inlet valve for connection onto the inlet of the compressor element and an internal part which together with the external part delimits a flow channel between the entry and the exit of the inlet valve, whereby this channel is closable by means of a valve which in rest mode is pushed by means of a spring against a valve seat of the inlet valve, characterised in that this valve is composed of a piston and a co-operating valve member, whereby the piston is mounted in an axially slidable way in a guide of the internal part of the housing and by means of said spring is pushed in the direction of the valve seat, whereby the piston on the side turned away from the valve seat is connected with the exit of the inlet valve and whereby the valve member is located on the other side of the piston and is formed by a valve shaft piston and a head provided on the valve shaft piston, whereby the valve shaft piston is mounted in a coaxially slidable way in the piston up to a certain depth which is limited by a stop which is such that in rest mode the valve member is pushed by the piston against the valve seat under the influence of said spring, whereby between the valve shaft piston and the valve member an intermediary chamber is enclosed which is provided with at least one blow-off entry via which the intermediary chamber can be brought in fluid connection with the pressure vessel and at least one blow-off exit that forms a permanent fluid connection between the intermediary chamber and the entry of the inlet valve, whereby the valve shaft piston also contains a bypass channel which is connected with the intermediary chamber and which ends in the sidewall of the valve shaft piston, either directly, or indirectly via a blow-off exit of the intermediary chamber.

Such inlet valve is simple to realise and contains few parts and still allows all said applications to be realised with only one control valve and without an extra non-return valve for blowing off the pressure vessel, bypassing to retain a minimum pressure in the pressure vessel and for condensate prevention in the oil.

The inlet valve is universally applicable for fixed-speed compressors or with a variable rotational speed and/or with condensate prevention function, whereby in this last case even fewer control valves are needed than known.

The double valve also functions as a non-return valve as it were, such that no extra non-return valve is needed to prevent that in the event of a sudden failure of the drive of the compressor element, oil could be ejected from the pressure vessel via the inlet and the inlet filter.

The spring ensures that the valve member and the piston together function as a non-return valve, such that, when no gas is sucked in due to the failure of the drive, the inlet valve closes the inlet and therefore no oil can be ejected via the inlet while the blowing off of pure gas from the pressure vessel via the blow-off entry and blow-off exit always remains possible.

Preferably, the inlet valve is a valve with a vertical set-up in which the axial direction of the piston and of the valve member are vertically oriented with the valve member above the piston.

In that case the weight of the valve member helps to keep the inlet valve open.

Preferably, the valve shaft is mounted slidably with a slidable fit, without seals in the piston, such that the valve member is slidable in the piston without significant resistance. Furthermore, this means the number of components of the inlet valve is kept to a minimum.

Preferably, said spring is the only spring of the inlet valve, which also reduces the number of components.

Preferably, the inlet valve is provided with an intermediary seal between the stop-forming collar of the wider head and the stop-forming edge of the piston.

That offers the advantage that the double valve can act as a one-piece non-return valve when the piston pushes the valve member against the valve seat under the influence of the spring, as in that case no pressurised gas can escape between the piston and the valve member.

According to a special aspect, the head of the valve member at the contact zone with the valve seat is provided with a head seal for a better sealing of the air inlet when the inlet valve is closed.

Preferably, the head of the valve member is covered with a sealing membrane to form the intermediary seal and the head seal.

Preferably, the sealing membrane is provided with a blow-off opening which forms a fluid connection between said blow-off exit of the intermediary chamber and the entry of the inlet valve, such that gas can be blown from the pressure vessel via the intermediary chamber and this blow-off opening to the outside.

Preferably, the diameter of the head of the valve member on the level of the contact zone with the valve seat is greater than the outer diameter of the valve shaft piston of the valve member, to avoid flapping of the inlet valve in no-load operation with blow-off or bypass.

The invention also relates to a compressor with a compressor element and a pressure vessel which are connected to the outlet of the compressor element which is provided with an inlet valve according to any one of the previous claims whereby this inlet valve via a blow-off conduit with a blow-off valve therein is in fluid connection with at least one blow-off entry of the intermediary chamber of the inlet valve and whereby the inlet valve, in particular the blow-off exit and the bypass channel, are dimensioned such that, with the compressor element in no-load operation whereby the inlet valve is completely open and the blow-off valve is opened to blow off the content of the pressure vessel via the inlet valve, the pressure after stabilisation of the regime is between 0.05 and 0.15 MPa.

That offers the advantage that in this way a sufficient pressure is maintained in the pressure vessel to guarantee, also during the no-load operation, a sufficient oil supply to the compressor element under the influence of the vessel pressure, on the one hand, and, on the other hand to have a relatively low counter pressure which ensures a relatively low power consumption in this no-load situation.

Preferably, the form and the dimensions of the head of the inlet valve are chosen such that during the load operation of the compressor element, whereby said blow-off valve in the blow-off conduit is closed and the inlet valve is open to let the compressor element suck in gas via the inlet valve, the pressure difference between the static pressure at the entry of the inlet valve and the static pressure in the intermediary chamber of the inlet valve exerts a force on the valve member directed away from the valve seat.

In this way the flow of the gas between the valve seat and the valve member generates a force that helps keep the valve open.

Practice shows that in the opposite case, the valve would be sucked shut again by the flow when the head of the valve member, against all expectations, has a streamlined convex form with little load losses.

It was therefore a surprise to find that the best results were obtained with a valve member the head of which in the zone where the head of the valve member makes contact with the valve seat is formed by a perpendicular edge of the head of the valve member.

A form that in tests shows good results is one whereby the head of the valve member at one end is made essentially cylindrical, whereby the short contour edge of this cylindrical end forms the zone with which the head of the valve member in the closed condition of the inlet valve comes into contact with the valve seat of the housing of the inlet valve.

The cylindrical short end can for example be made flat with a plane that extends perpendicularly to the axial direction of the valve member.

To this end the head of the valve member can be convex with a channel to the blow-off exit of the intermediary chamber of the inlet valve or at least partially concave and spanned by said sealing membrane which is provided with a blow-off opening.

Preferably, the housing of the inlet valve is provided with a blow-off connection for the external connection of said blow-off conduit with the blow-off valve mounted therein, in which this blow-off conduit ends on the level of said blow-off entry of the intermediary chamber of the inlet valve or of an intermediary chamber connected with it, such that this blow-off opening is constantly connected with the intermediary chamber of the inlet valve.

In this way the intermediary chamber can be connected with the pressure vessel in all positions of the inlet valve by opening said blow-off valve.

The invention can be particularly applied to an oil or liquid-lubricated compressor element, whereby the operation of the inlet valve as non-return valve is guaranteed at all times, such that when shutting off or in the event of an accidental failure of the drive of the compressor element, oil or liquid is prevented from being ejected from the pressure vessel via the compressor element and the inlet valve, and this without application of an extra non-return valve.

An inlet valve according to the invention can be applied in a compressor with a fixed-speed drive of the compressor element, whereby the bypass channel is indirectly fluidly connected with the intermediary chamber of the inlet valve through a blow-off exit.

In this case, said blow-off valve can serve as operating element to switch between the load and no-load operation of the compressor element at the fixed speed of the drive.

An inlet valve according to the invention can also be applied in an oil-injected compressor with a variable-speed drive of the compressor element, whereby the bypass channel is in direct fluid connection with the intermediary chamber of the inlet valve.

In this case the blow-off valve can serve as operating element in order to avoid condensate formation in the oil if there is a risk of condensate formation when switching from load to no-load operation by dropping to no-load speed, by continuing to drive the compressor element at a speed that is higher than the no-load rotational speed while opening the blow-off valve until the danger of condensate formation has gone.

This provides the advantage that in that case only one single blow-off valve suffices to switch the compressor from load to no-load and vice versa and to control the condensate prevention.

BRIEF DESCRIPTION OF THE INVENTION

With the intention of better showing the characteristics of the invention, a few preferred embodiments of an inlet valve according to the invention and a compressor element and compressor equipped with it are described hereinafter by way of an example, without any limiting nature, with reference to the accompanying drawings, wherein:

FIG. 3 shows a cross-section according to the line III-III in FIG. 2 with the inlet valve in rest mode;

FIG. 13 shows an overview of different forms of an inlet valve according to the invention.

DETAILED DESCRIPTION OF THE INVENTION

Figure 1:
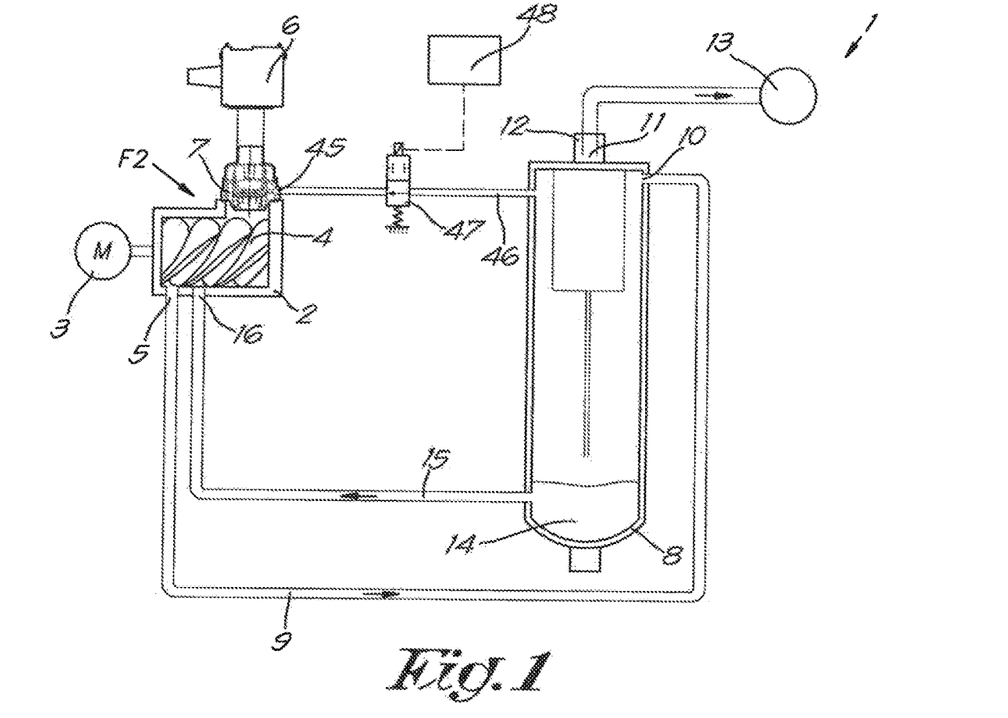
FIG. 1 schematically shows a compressor with a compressor element with an inlet valve according to the invention.

The compressor 1 shown in FIG. 1 is an oil-injected screw compressor containing a compressor element 2 with a fixed-speed drive 3.

The compressor element 2 is provided with an inlet 4 and an outlet 5.

The inlet 4 is connected to an inlet filter 6.

Between the inlet 4 and the inlet filter 6, an inlet valve 7 according to the invention is mounted.

A pressure vessel 8 is connected to the outlet 5 via a pressure conduit 9 which is connected to the entry 10 of the pressure vessel 8.

The pressure vessel 8 is provided with an exit 11 with a pressure relief valve 12 to which a user network 13 is connected or can be connected which uses the pressurised gas supplied by the compressor element 2.

The pressure vessel 8 is filled with oil 14 up to a certain level which in the known way under the influence of the pressure in the pressure vessel 8 is injected via an injection conduit 15 on the level of one or more injection points 16 into the compressor element 2, among others for the lubrication and cooling of the compressor element 2.

Figure 2:
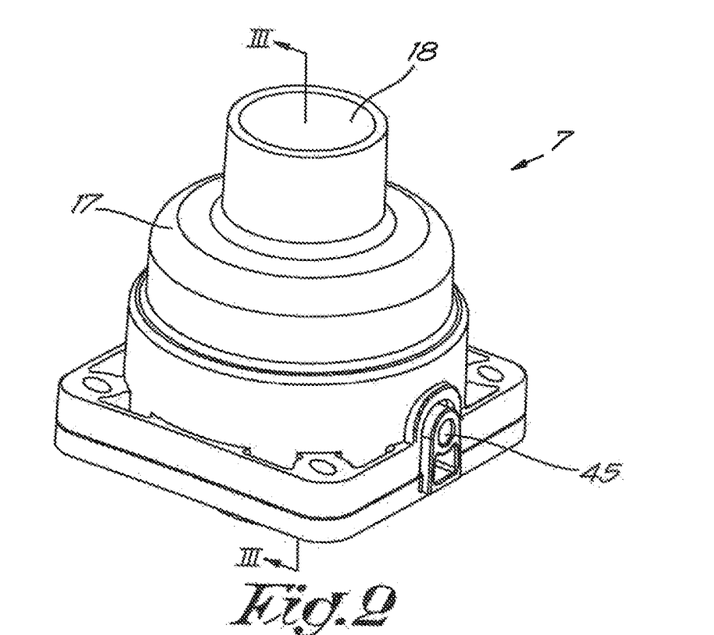
FIG. 2 shows a perspective view of the inlet valve indicated in FIG. 1 by F2.
Figure 4:
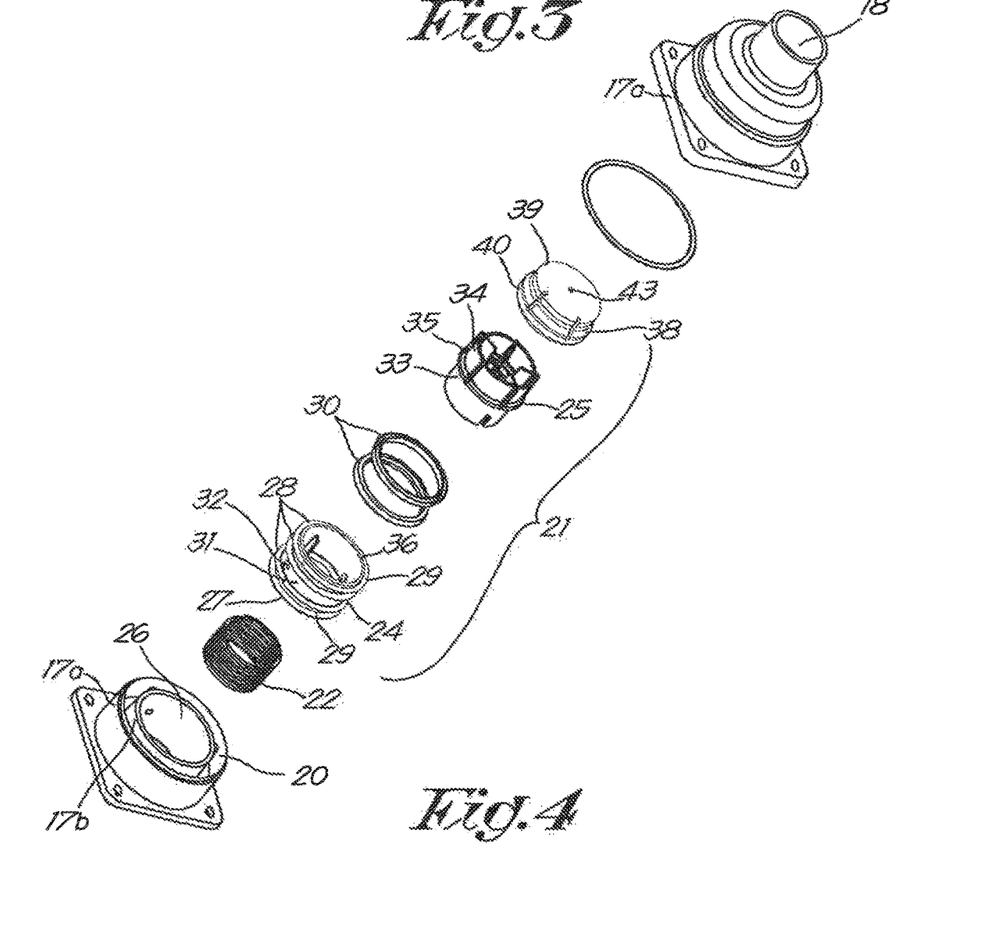
FIG. 4 shows the inlet valve of FIG. 2 in disassembled condition.

The inlet valve 7 is shown in more detail in FIGS. 2 and 3.

It contains a housing 17 with an external part 17a and an internal part 17b mounted therein.

The external part 17a is provided with an entry 18 for the inlet valve 7 which connects to an inlet filter 6 and an exit 19 which connects to the inlet 4 of the compressor element 2.

The internal part 17b defines, together with the external part 17a, a flow channel 20 between the entry 18 and the exit 19 of the inlet valve 7, whereby this flow channel 20 is closable by means of a valve 21 which in rest mode of FIG. 3 is pushed by means of a spring 22 against a valve seat 23 of the housing 17 to close the inlet 18.

According to the invention, the valve 21 is a double valve which is composed of a piston 24 and a valve member 25 that co-operates with it.

The piston 24 is mounted slidably in an axial direction X-X' in a guide 26 of the internal part 17b of the housing 17 and is pushed in the direction of the valve seat 23 by means of said spring 22.

The axial direction X-X' is vertically oriented in the example.

On the bottom 27 turned away from the valve seat 23, the piston 24 is in contact with the pressure/underpressure in the inlet 4 of the compressor element 2.

Along its outer contour, the piston 24 is provided with one or more pairs of laterally protruding contour ribs 28 which each define a groove 29 in which an O-ring or other seal 30 is mounted to form a seal between the piston 24 and its guide 26.

In the example shown the contour ribs 28 define an intermediate chamber 31 located between the O-rings or other seals 30.

The piston 24 is made in a concave way and contains one or more blow-off entries 32 which form a fluid connection between the intermediate chamber 31 and the inside of the concave piston 24.

The valve member 25 is mounted between the piston 24 and the valve seat 23.

The valve member 25 is formed by a valve shaft piston 33 with which the valve member 25 is mounted coaxially slidable with the piston 24 in the concave piston 24 and a head 34 provided on the valve shaft piston 33 which restricts the depth over which the valve member 25 can slide into the piston 24 by a stop which in this case is formed by, on the one hand, a stop-forming collar of the head 34 which is formed because the head 34 is made wider than the valve shaft piston 33, and, on the other hand, a co-operating stop-forming edge 36 at the top of the piston 24.

The valve shaft piston 33 is mounted slidably with a slidable fit without any seal in the piston 24.

The stop 35-36 is such that in the rest mode of FIG. 3, the valve member 25 with the contour edge of its top short end is pushed by the piston 24 against the valve seat 23 under the influence of said spring 22.

Preferably, the diameter A of the head 34 of the valve member 25 on the level of the contact zone with the valve seat 23 is greater than the outer diameter B of the valve shaft piston 33 of the valve member 25.

The valve member 25 is made in a concave way with a bottom 37 turned towards the piston.

The head 34 of the valve member 25 is spanned by a sealing membrane that ensures the formation of a head seal 38 on the level of the contact zone of the valve member 25 with the valve seat 23 and the formation of the intermediary seal between the valve member 25 and the piston 24 on the level of the stop 35-36 when the valve member with its stop-forming collar 35 is slid up against the stop-forming edge 36 of the piston 24.

It is clear that the seals 38 and 39 can also be replaced with separate seals or direct contact between the valve member 25 and the valve seat, on the one hand, and direct contact between the valve member 25 and the piston 24.

Please note that in the example shown in FIG. 3, the head 34 of the valve member is made in a cylindrical way with a flat short end formed by a part of the sealing membrane 38 which covers the concave valve member and extends perpendicularly to the axial direction X-X'.

Between the valve shaft piston 33 and the piston 24, an intermediary chamber 41 is enclosed which via a blow-off exit 42 in the bottom 37 of the valve member 25 and a central blow-off opening 43 in the sealing membrane 38 is in permanent fluid connection with the entry 18 of the inlet valve 7.

Furthermore, the valve shaft piston 33 contains a bypass channel 44 which ends laterally just above the bottom 37 of the valve member 25 between the stop-forming collar 35 of the valve member 25 and the stop-forming edge of the piston 24 with a valve in rest mode as shown in FIG. 3.

Via the concave valve member 23 and the blow-off exit 42 in the bottom 37 of the valve member, this bypass channel 44 is indirectly connected with the intermediary chamber 41.

The housing 17 is provided with at least one blow-off connection 45 to which a blow-off conduit 46 is connected which is in fluid connection with the content of the pressure vessel 8 above the level of the oil 14.

The blow-off connection 45 ends in the inlet valve on the level of the intermediate chamber 31 which is itself connected via the blow-off entry 32 with the intermediary chamber 41.

In the blow-off conduit 46, a blow-off valve 47 is mounted which allows the blow-off conduit 46 to be opened or closed.

The blow-off valve 47 is in this case an electro-valve which is normally open and can be operated by means of a control 48.

Please note that in the example of FIG. 1 the blow-off valve is the only valve.

The operation of the device 1 is as follows.

Departing from standstill with an inlet valve 7 in the rest mode of FIG. 3 the compressor 1 can be started by launching the drive 3.

Figure 5:
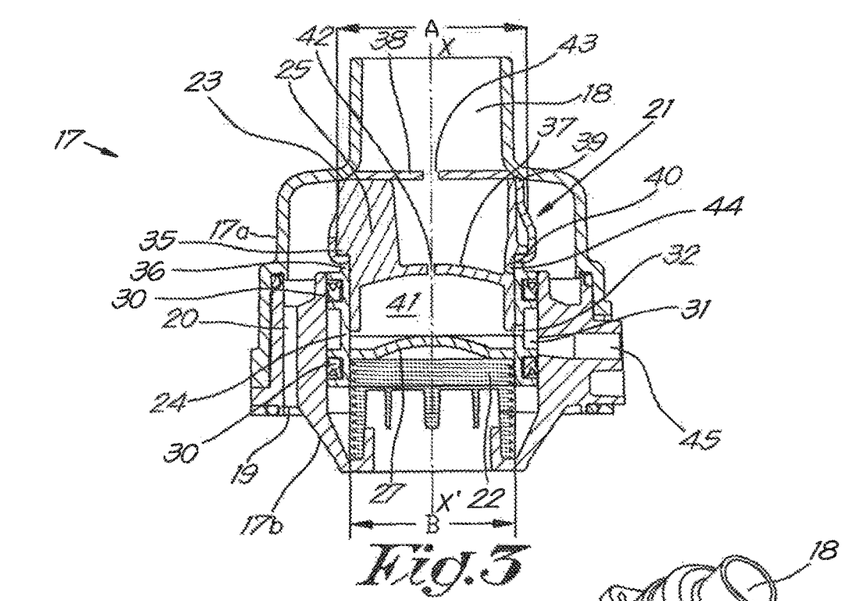
FIGS. 5 to 11 show different operating conditions of the inlet valve of FIG. 3 shown in a simplified diagram of the compressor of FIG. 1.

Consequently, an underpressure is built up in the inlet 4 of the compressor element which pulls down and opens both the piston 24 and the inlet valve against the pressure of the spring 22 as shown in FIG. 5.

The pressure in the pressure vessel 8 starts to build up. Via the open blow-off valve 47, this pressure is connected with the intermediary chamber 41 which also comes under pressure because of this and pushes up the valve member 25 until it closes the inlet valve 7 as shown in FIG. 6.

Figure 6:
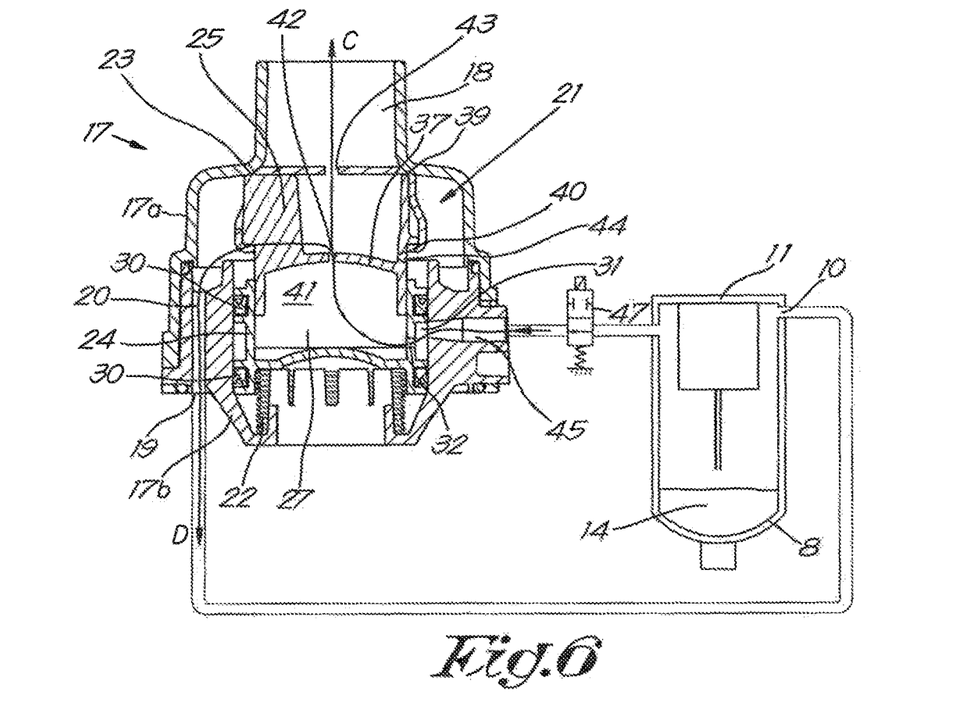

At that moment no more gas is sucked in and gas is blown off from the pressure vessel 8 via the intermediary chamber 41 and the blow-off exit 42 in the bottom 37 of the valve member 25 and the blow-off opening 43 in the sealing membrane 38 to the outside via the inlet filter 6 as shown with arrow C in FIG. 6 and at the same time gas is bypassed from the pressure vessel 8 to the inlet 4 of the compressor element 2 via the intermediary chamber 41 and the bypass channel 44 and thus back to the pressure vessel 8 as shown with arrow D in FIG. 6.

Consequently, during the start-up the pressure in the pressure vessel 8 is kept limited, such that the required start-up torque and start-up power are also limited.

Figure 7:
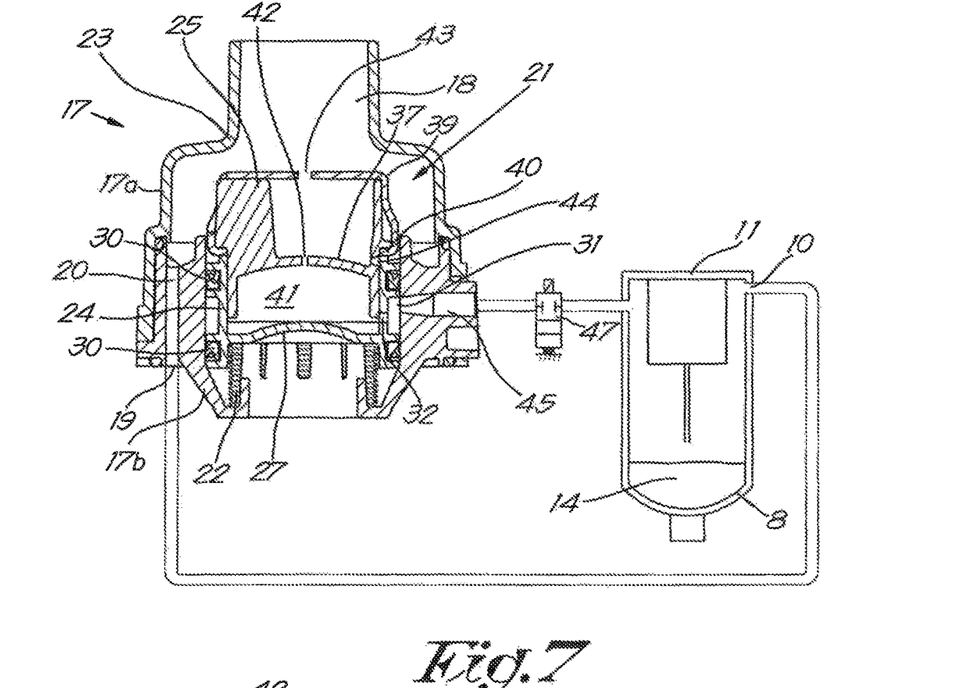

Once the drive is sufficiently launched, the required start-up power drops and at that moment the blow-off valve 47 is closed such that the pressure vessel is no longer blown off and in this way the compressor element 2 can suck open the inlet valve 7 as shown in FIG. 7 and can start building pressure in the pressure vessel 8. This is referred to as a load operation.

If during the load operation of FIG. 7 with completely opened inlet valve 7, the pressure in the pressure vessel 8 rises too high, for example because of less consumption from the user network, the compressor 1 is put in a no-load condition.

Figure 8:
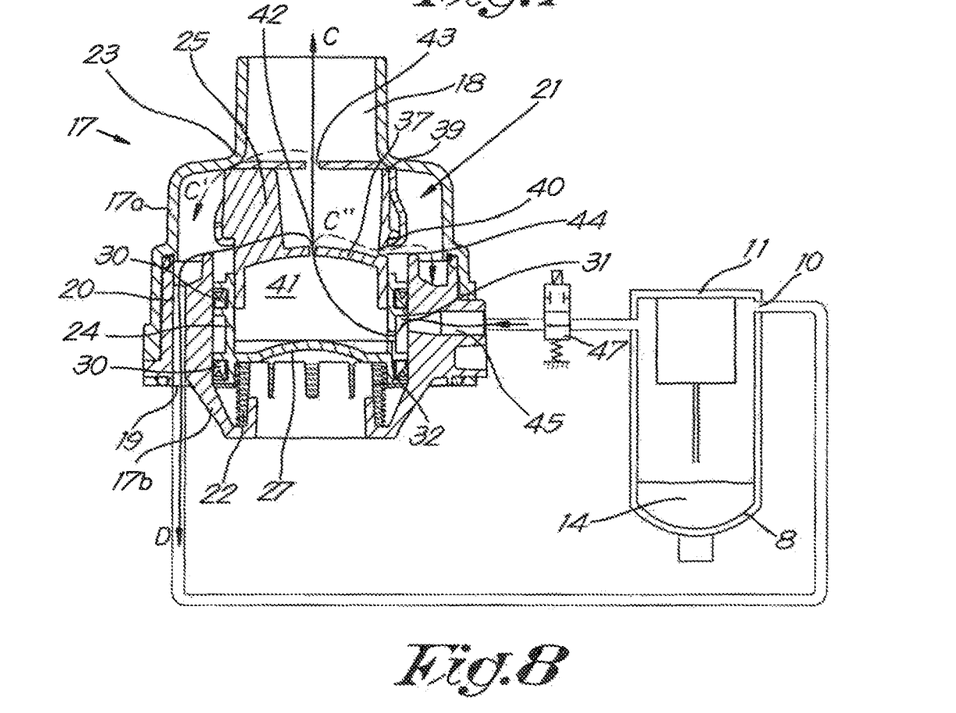

To this end, the blow-off valve 47 is opened again such that the pressure from the pressure vessel 8 is allowed to flow to the intermediary chamber 41, such that the valve element 25 is pushed up against the valve seat 23, while the piston remains sucked into its lowest position by the underpressure at the bottom 27 of the piston 24.

Consequently, the gas is blown off from the pressure vessel 8 as shown with arrow C in FIG. 8 and partly bypassed as shown with arrow D in FIG. 8.

In balance the inlet valve 7 will open slightly, such that the gas that is blown off via route C is sucked in again as shown with arrow C' in FIG. 8 and/or via the bypass channel 44 as shown with arrow C".

Consequently, the pressure in the pressure vessel 8 drops again, partly because of the fact that no fresh gas is sucked in and compressed due to the closed inlet valve 7.

Because of the decreased pressure during this phase of no-load operation with a fixed speed, only a limited power consumption is needed to drive the compressor element 2.

However, the oil supply to the compressor element 2 needs to be continued for which a minimum pressure is required in the pressure vessel 8.

To this end the inlet valve 7, in particular the blow-off exit 42 and the bypass channel 44, is dimensioned such that, with the compressor element in no-load operation with the inlet valve 7 and the blow-off valve 47 open, the pressure after stabilisation of the regime is between 0.05 and 0.15 MPa.

To go back from the no-load situation of FIG. 8 to a load situation, for example when there is consumption again, it suffices to close the blow-off valve again with an operating drive 3.

This puts the intermediary chamber 41 under atmospheric pressure again via the connection 42-43 between the chamber 41 and the entry 18 of the inlet valve 7.

The piston and the valve member are then sucked down again by the operation of the compressor element 2 to the condition of FIG. 5, such that gas can be sucked in and compressed again.

To stop the compressor, it is first put in a no-load situation as explained before by opening the blow-off valve 47, such that the no-load situation of FIG. 8 is achieved with the inlet valve 7 as good as closed, to thereafter stop the drive 3.

The compressor element 2 then stops operating such that the pressure from the pressure vessel 8 ends up itself via the compressor element 2 in the inlet 4 and the inlet valve 7, as well as under the piston 24 and in the flow channel 20, while in the intermediary chamber 41 as well the pressure of the pressure vessel 8 is present via the open blow-off valve 47.

Figure 9:
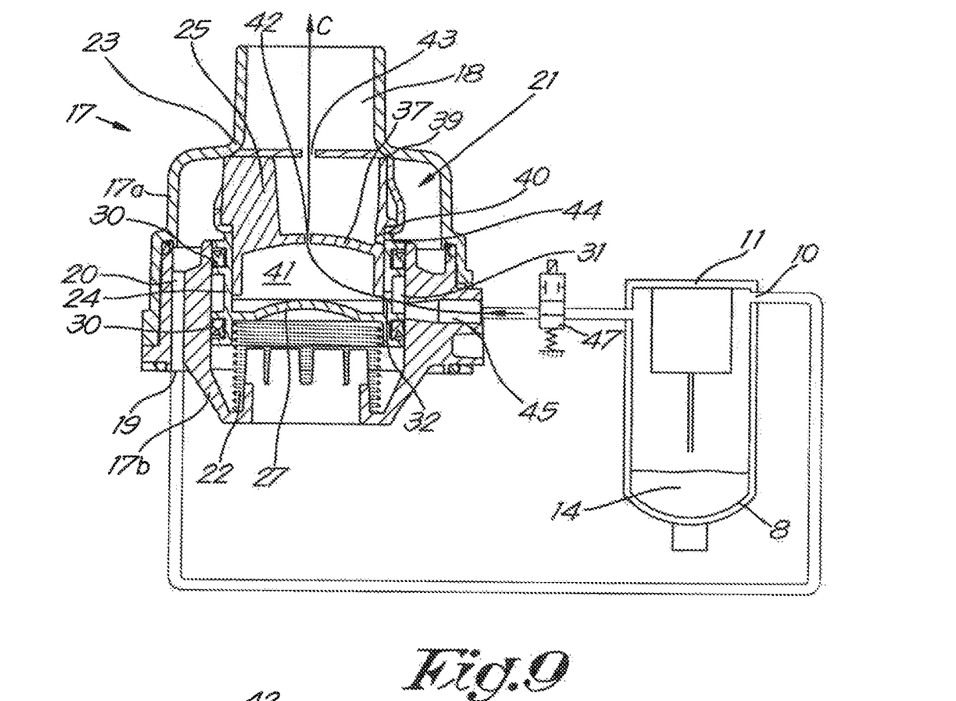

Due to the upward force of the spring 22, this pressure balance above and under the piston 24 pushes the piston 24 up against the stop-forming collar 35 of the valve member 25 as shown in FIG. 9, such that the intermediary seal 40 of the sealing membrane 38 forms a seal between the piston 24 and the valve member 25.

However, the pressure vessel 8 remains in connection with the entry 18 of the inlet valve 7 as indicated with arrow C in FIG. 9, such that the pressure in the pressure vessel 8 will gradually drop.

Thanks to the intermediary seal 40, the combination of piston 24 and valve member 25 in this situation behaves as a non-return valve which stops the gas and the oil, which itself flowed back via the compressor element 2 to the inlet 4 of the compressor element 2, from being able to escape via the inlet filter 6, which without this effect of the non-return valve could cause gas along with oil to be ejected via the inlet filter 6, which is not desirable of course.

Therefore, in this case no extra non-return valve is needed as with the known compressors.

The operation of the piston 24 and valve member 25 combination as non-return valve is also important in the event of a breakdown whereby in a load situation of the compressor 1, the drive 3 suddenly failed, for example in the event of a belt breakage or a defect of the converter in case of a frequency-controlled variable-speed drive.

As the failure of the drive 3 occurs during a load operation the blow-off valve 47 is closed at that time and the inlet valve 7 is completely open as shown in FIG. 7.

Due to the failure of the compressor element 2, there is a risk of gas escaping together with oil to the outside via the inlet filter 6.

However, the pressure of the pressure vessel 8 nestles itself via the compressor element 2 under the piston 24 while above the piston 24 in the intermediary chamber 41 there is low pressure due to the closed blow-off valve 47.

Figure 10:
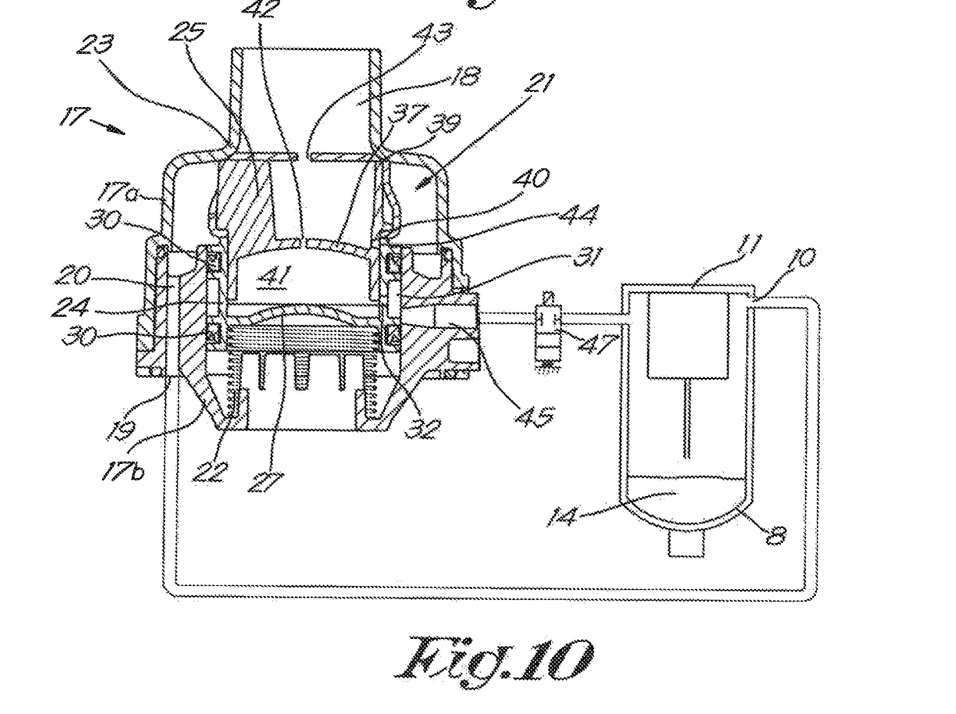

Due to the effect of the pressure under the piston 24 and the upward force of the spring 22, the piston 24 is pushed up, together with the valve member 25, as a non-return valve against the valve seat 23 as shown in FIG. 10. This prevents, also in the event of the drive 3 failing, oil from being ejected via the air filter 6.

Figure 11:
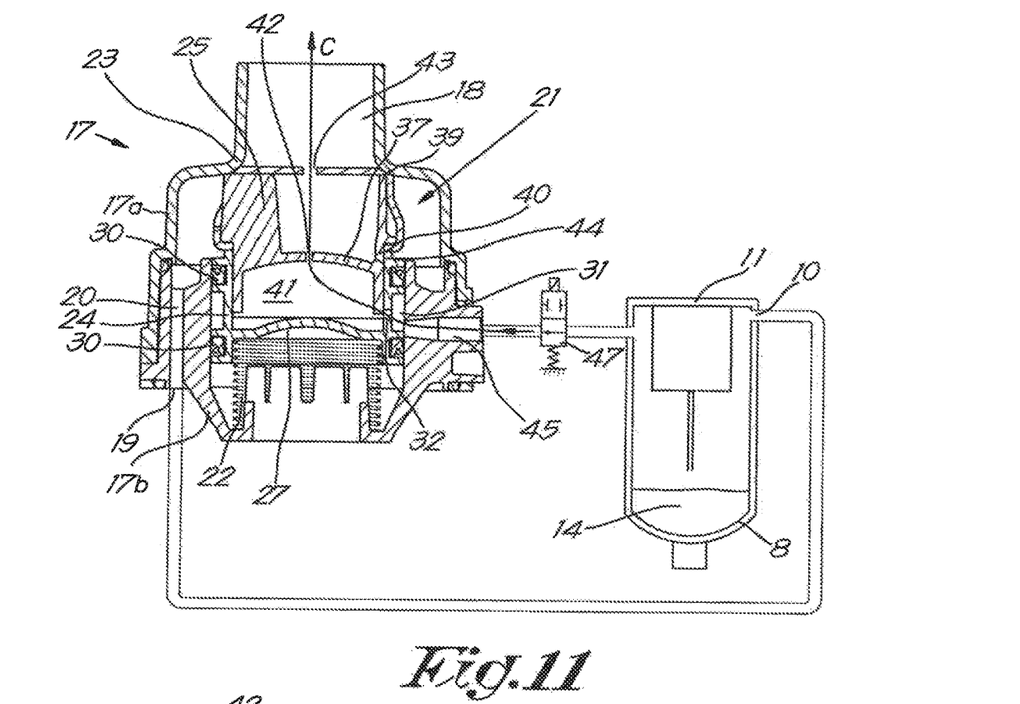

When the breakdown of the drive 3 is detected, the closable valve 47 can be opened to blow off the pressure in the pressure vessel as shown with arrow C in FIG. 11.

It is clear that under all circumstances the unintentional ejection of oil via the air filter 6 is prevented thanks to the non-return valve function of the piston 24 and valve member 25.

Figure 12:
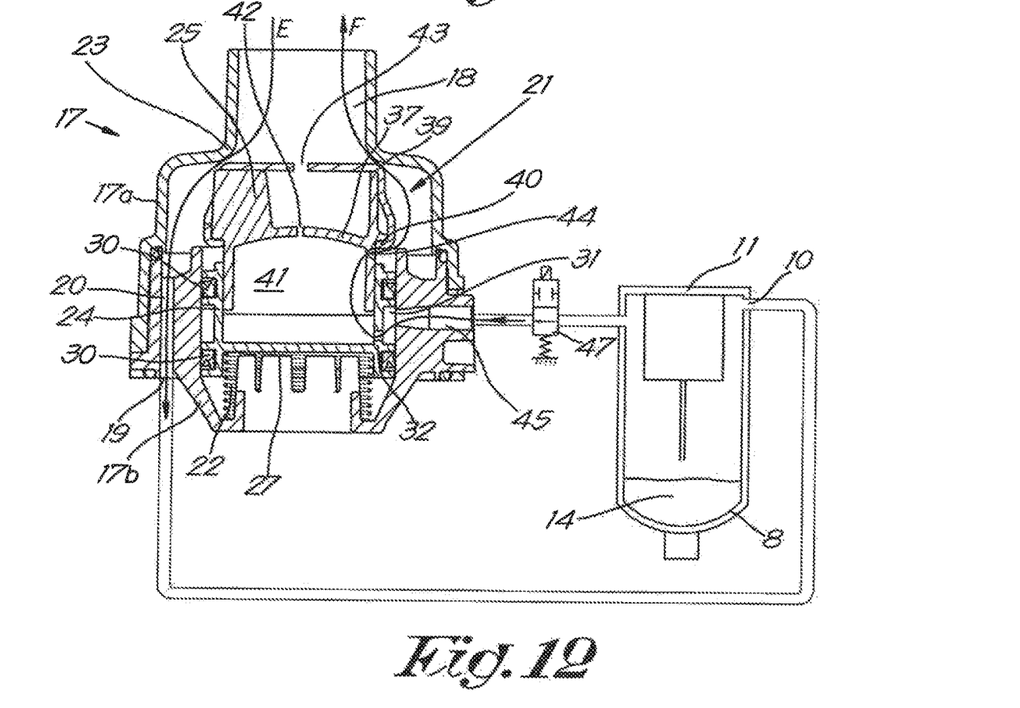
FIG. 12 in a cross-section such as that of FIG. 3 shows a variant embodiment of an inlet valve according to the invention.
Figure 15:
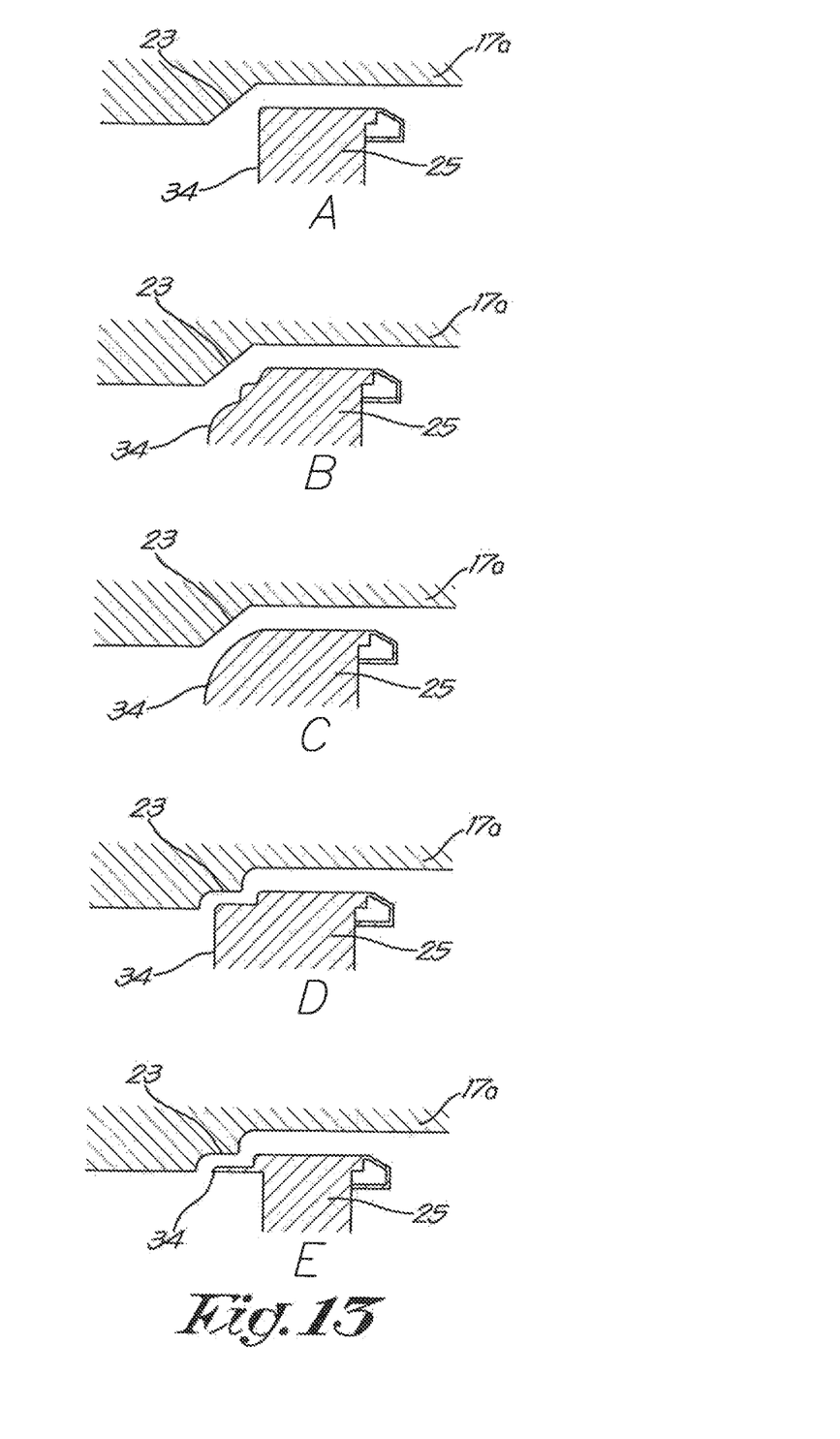

FIG. 12 shows an alternative inlet valve 7 which differs from the inlet valve of FIG. 3 in that the bypass channel 44 in this case is located under the bottom 37 of the valve member 25, such that in this case the bypass channel 44 is directly connected with the intermediary chamber 41.

Such inlet valve 7 can be applied in an oil-injected compressor such as that of FIG. 1 but with a variable rotational speed and this to avoid the formation of condensation in the oil 14 at low temperatures of the oil which can occur, for example, when switching from load with closed blow-off valve 47 to no-load by lowering the rotational speed of the compressor element 2.

In that case, on switching to no-load, first the temperature of the oil is measured and when this risks dropping under the condensation temperature, the compressor element 2 will be temporarily continued to be driven at load speed and the blow-off valve 47 will be opened as shown in FIG. 12.

In that case the inlet valve 7 remains partly open such that gas is sucked in and compressed as shown with arrow E in FIG. 12 while at the same time the pressure vessel 8 is blown off as shown with arrow F in FIG. 12.

The compression of the gas generates compression heat that is used to heat up the oil until the temperature of the oil is higher than the condensation temperature.

It is clear that in this case the condensate prevention can be controlled with only one single blow-off valve 47.

FIG. 13 shows a few examples of possible variants of inlet valves whereby one is better than the other in the field of opening without the dynamic flow effect causing the valve member to be sucked shut again.

Embodiment "a" thereby corresponds with the inlet valve as described above with a valve member 25 with a flat head and a perpendicular finish on the level of the contact zone with the valve seat 23.

Surprisingly enough such valve element gives the best results, better for example than those of the rather streamlined bullet form of embodiment "c" of which one would expect better results, but which tend more to be sucked shut on their own again with the suction of gas by the compressor element 2.

Embodiment "e" shows that it is also possible, for example, to use a concave valve member 25, such as that of FIG. 3 but whereby the cavity of the valve member is left open and thus without the sealing membrane 38 covering the valve member 25.

When choosing the form and the dimensions of the head 34 of the valve member and of the zone of the housing 17 around the valve seat it is important to choose such, that during the load operation of the compressor element 2 whereby said blow-off valve 47 is closed and the inlet valve is open, the pressure difference between the static pressure at the entry 18 of the inlet valve 7 and the static pressure in the intermediary chamber 41 due to the dynamic pressure drop by the flow of the air sucked in through the valve seat, ensures that a force is exerted on the valve member 25 that is directed away from the valve seat 23.

The present invention is by no means limited to the embodiments described as an example and shown in the drawings, but an inlet valve according to the invention and a compressor element and compressor equipped with this can be realised in all kinds of forms and dimensions, without departing from the scope of the invention.

The invention claimed is:

1. An inlet valve for an inlet of a compressor element of a compressor (1), the compressor (1) provided with a pressure vessel (8) connected to the outlet (5) of the compressor element (2), the inlet valve (7) containing: a housing (17) with an external part (17a) with an entry (18) for the inlet valve (7) and an exit (19) for the inlet valve (7) for connection onto the inlet (4) of the compressor element (2) and an internal part (17b) which together with the external part (17a) delimits a flow channel (20) between the entry (18) and the exit (19) of the inlet valve (7), whereby the flow channel (20) is closable by means of a valve (21) which in rest mode is pushed by means of a spring (22) against a valve seat (23) of the inlet valve (7), wherein the valve (21) includes a piston (24) and a co-operating valve member (25), whereby the piston (24) is mounted slidably in an axial direction (X-X') in a guide (26) of the housing (17) and by means of said spring (22) is pushed towards the valve seat (23), whereby the piston (24) on a side (27) turned away from the valve seat (23) is connected with the exit (11) of the inlet valve (7) and whereby the co-operating valve member (7) is located on an other side of the piston (24) and is formed by a valve shaft piston (33) and a head (34) provided on the valve shaft piston (33), whereby the valve shaft piston (33) is mounted in a coaxially slidable way in the piston (24) up to a certain depth which is limited by a stop which is such that in rest mode the co-operating valve member (25) is pushed by the piston (24) against the valve seat under the influence of said spring (22), whereby between the valve shaft piston (33) and the piston (23) an intermediary chamber (41) is enclosed which is provided with at least one blow-off entry (32) via which the intermediary chamber (41) can be brought in fluid connection with the pressure vessel (8) and at least one blow-off exit (42) that forms a permanent fluid connection between the intermediary chamber (41) and the entry (18) of the inlet valve (7), whereby the valve shaft piston (33) also contains a bypass channel (44) which is connected, either directly or indirectly via the at least one blow-off exit (42), with the intermediary chamber (41) and which ends in the sidewall of the valve shaft piston (33).

2. The inlet valve according to claim 1, characterised such that the piston (24) and the valve member (25) are in their axial direction (X-X') vertically oriented with the valve member (25) above the piston (24).

3. The inlet valve according to claim 1, characterised in that seals (30) are provided between the piston (24) and the guide (26) of the housing (17).

4. The inlet valve according to claim 1, characterised in that the valve shaft piston (33) is mounted slidably with a slidable fit in the piston (24) without intervention of seals.

5. The inlet valve according to claim 1, characterised in that said spring (22) is the only spring of the inlet valve (7).

6. The inlet valve according to claim 1, characterised in that a diameter (A) of the head (34) of the valve member (25) on a level of a contact zone with the valve seat (23), is greater than an outer diameter (B) of the valve shaft piston (33) of the valve member (25).

7. The inlet valve according to claim 1, characterised in that said stop is formed by a stop-forming collar (35) of the head (34) and by a co-operating stop-forming edge (36) of the piston (24).

8. The inlet valve according to claim 7, characterised in that the head (34) of the co-operating valve member (25) at a contact zone with the valve seat (23) is provided with a head seal (39).

9. The inlet valve according to claim 7, containing an intermediary seal (40) between the stop-forming collar (35) of the head (34) and the stop-forming edge (36) of the piston (24).

10. The inlet valve according to claim 9, characterised in that the head (34) of the co-operating valve member (25) is covered with a sealing membrane (38) to form the intermediary seal (40) and a head seal (39).

11. The inlet valve according to claim 10, characterised in that the sealing membrane (38) is provided with a blow-off opening (43) which forms a fluid connection between said at least one blow-off exit (42) of the intermediary chamber (41) and the entry (18) of the inlet valve (7).

12. A compressor with a compressor element (2) and a pressure vessel (8) which is connected to an outlet (5) of the compressor element (2), characterised in that the compressor element (2) is provided with an inlet valve (7) according to claim 1, whereby this inlet valve (7) via a blow-off conduit (46) with a blow-off valve (47) therein is in fluid connection with at least one blow-off entry (32) of the intermediary chamber (41) of the inlet valve (7), and wherein the at least one blow-off exit (42) and the bypass channel (44) are dimensioned such that, with the compressor element (2) in no-load operation, the inlet valve (7) is completely open and the blow-off valve (47) is opened to blow off contents of the pressure vessel (8) via the inlet valve (7), the pressure in the pressure vessel (8) after stabilisation of the regime being between 0.05 and 0.15 MPa.

13. The compressor according to claim 12, characterised in that the housing (17) of the inlet valve (7) is provided with a blow-off connection (45) for external connection of said blow-off conduit (46) with the blow-off valve (47) mounted therein, which wherein the blow-off connection (45) ends at a level of the at least one blow-off entry (32) of the intermediary chamber (41) of the inlet valve (7) or at a level of an intermediate chamber (31) connected with the blow-off connection (45).

14. The compressor according to claim 12, wherein the compressor element (2) has a fixed-speed drive (3) and the bypass channel (44) is indirectly fluidly connected with the intermediary chamber (41) of the inlet valve (7) via a blow-off exit (42), whereby the blow-off valve (47) is used as an operating element for a switch between a load and no-load operation of the compressor element (2) at a fixed rotational speed of the fixed-speed drive (3).

15. The compressor according to claim 12, t wherein the compressor is an oil-injected compressor (1) and the compressor element (2) has a variable rotational speed drive (3), and the bypass channel (44) is in direct fluid connection with the intermediary chamber (41) of the inlet valve (7), and the blow-off valve (47) is used as an operating element in order to avoid condensate formation in the oil, wherein if there is a risk of condensate formation when switching from load to no-load operation by dropping to a no-load rotational speed, the compressor element (2) is continuously driven at a rotational speed that is higher than the no-load rotational speed and the blow-off valve (47) is opened until the risk of condensate formation has gone.

16. The compressor according to claim 15, characterised in that the blow-off valve (47) is the only valve of the compressor (1) capable of switching from the load to no-load operation and condensate prevention.

17. The compressor according to claim 12, wherein the head (34) of the inlet valve (7) and the valve seat are configured such that, during a load operation of the compressor element (2) whereby said blow-off valve (47) in the blow-off conduit (46) is closed and the inlet valve (7) is open to let the compressor element suck in gas via the inlet valve (7), a pressure difference between a first static pressure at the entry (18) of the inlet valve (7) and a second static pressure in the intermediary chamber (41) of the inlet valve (7) exercises a force on the valve member (25) that is directed away from the valve seat (23).

18. The compressor according to claim 17, characterised in that the head (34) of the valve member (25) is made essentially cylindrical at one end, whereby a short contour edge of the one end forms a zone with which the head (34) of the valve member (25), in the closed condition of the inlet valve (7), comes into contact with the valve seat (23) of the housing (17) of the inlet valve (7).

19. The compressor according to claim 17, characterised in that the valve member (25), in the zone where the head (34) makes contact with the valve seat (23), shows a perpendicular edge.

20. The compressor according to claim 19, characterised in that a short contour edge of a cylindrical end of the valve member (25) is flat and extends perpendicularly to the axial direction (X-X').

21. The compressor according to claim 20, characterised in that the head (34) of the valve member (25) is made partially concave and spanned by a sealing membrane (38) that is provided with a blow-off opening (43).

\* \* \* \* \*